Nov. 15, 1932.　　L. W. BROWNE　　1,888,158

FLEXIBLE VALVE STEM JOINT

Filed July 31, 1931　　2 Sheets-Sheet 1

Inventor
Lyle W. Browne,
By Prevost & Prevost
Attorneys

Nov. 15, 1932.  L. W. BROWNE  1,888,158
FLEXIBLE VALVE STEM JOINT
Filed July 31, 1931  2 Sheets-Sheet 2

Inventor
Lyle W. Browne,
By Prevost & Prevost
Attorneys

Patented Nov. 15, 1932

1,888,158

UNITED STATES PATENT OFFICE

LYLE W. BROWNE, OF MARSHALLTOWN, IOWA, ASSIGNOR TO THE FISHER GOVERNOR COMPANY, OF MARSHALLTOWN, IOWA

FLEXIBLE VALVE STEM JOINT

Application filed July 31, 1931. Serial No. 554,365.

My invention consists in new and useful improvements in a flexible joint for valve stems and has for its object to provide a device of this character which is particularly adapted for aligning a valve and valve stem in a valve seat or port.

Heretofore, in valve structures wherein the valve stem extends through a stuffing box, it has been a considerable problem to maintain the vertical center line of the stuffing box properly aligned with the center line of the valve seat port so that the stem and valve will operate without binding and undue friction and wear of parts. Without proper alignment, the valve stem is caused to drag or push the valve disc to one side or the other, rendering it difficult to seat and close tightly.

It is the object of my invention to overcome these disadvantages and to this end I have provided a flexible joint whereby the valve disc is capable of relative movement and self-adjustment with respect to the valve stem by which the same is carried.

A further object of my invention is to provide a flexible joint by means of which the valve disc is afforded a substantially universal movement, thus enabling the valve disc to align itself with respect to the valve seat or port.

A still further object of the present invention is to allow a universal movement of the valve disc with respect to the stem as hereinbefore mentioned, but to provide means for positively preventing the valve disc from turning beyond a predetermined point in the valve body, or in other words, for limiting its rotary movement.

With the above and other objects in view which will appear as the description proceeds, my invention consists in the novel features herein set forth, illustrated in the accompanying drawings and more particularly pointed out in the appended claims.

Referring to the drawings in which numerals of like characters designate similar parts throughout the several views, Fig. 1 shows one form of my invention as applied to a double seated inner valve or spool valve wherein the valve disc carries the stop pin, the ferrule being provided adjacent said pin with a complementary slot.

Figure 1:
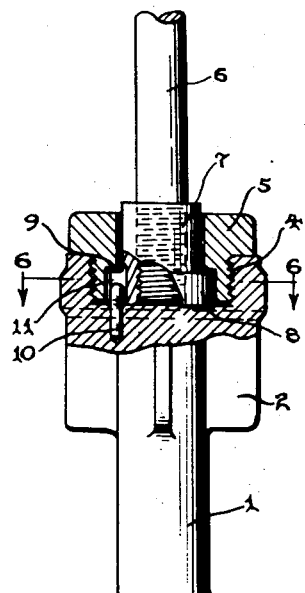
Figure 2:
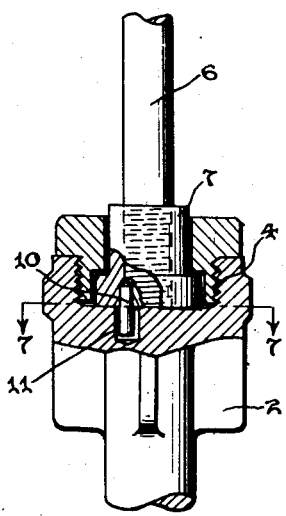
Fig. 2 is a fragmentary view similar to Fig. 1 but showing a modified form of joint, wherein the ferrule carries the stop pin and the complementary slot or recess is located in the adjacent surface of the valve disc.

In the drawings, 1 represents the valve proper in the form shown, consisting of upper and lower valve discs 2 and 3 respectively. The upper valve disc is machined out centrally to form a circular recess 4 which is fitted with female threads to accommodate the reduced and threaded portion of a bushing 5.

6 designates a valve stem, the lower end of which is threaded to engage an enlarged ferrule 7, provided with an annular flange 8 at its lower extremity.

While I have shown and described the ferrule and stem as being connected by complementary threads it is obvious that I may if desired, employ other means of attaching these members, such as splitting the stem and wedging it to the ferrule, brazing, soldering, welding, keying or any other suitable mechanical means.

The bushing 5 is machined out internally to accommodate the ferrule 7 and is provided with an annular shoulder 9 adjacent the upper face of the shoulder 8, the shoulder 9 and inner walls of the bushing being of slightly larger dimensions than those of the ferrule 7 and flange 8, whereby when the parts are assembled, the required relative movement of the valve disc with respect to the stem and ferrule, is permitted.

Figure 3:
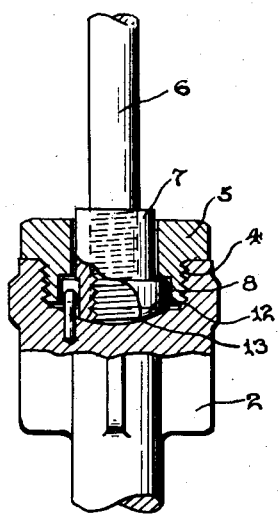
Fig. 3 is a view similar to Fig. 1 wherein the adjacent surfaces of the ferrule and valve disc are concavo-convex, whereby universal movement of the valve disc is afforded.
Figure 6:
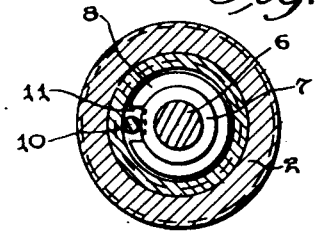
Fig. 6 is a sectional view taken on line 6—6 of Fig. 1.
Figure 11:
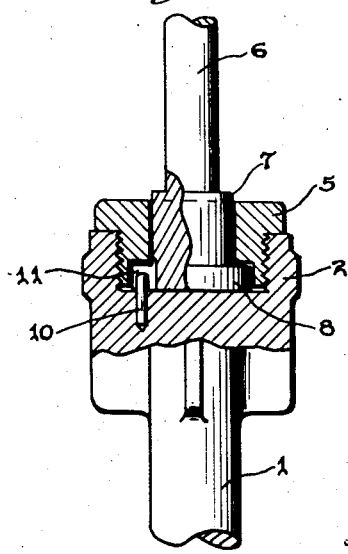
Fig. 11 shows a further modification of my invention wherein the ferrule is constructed integrally with the valve stem.
Figure 12:
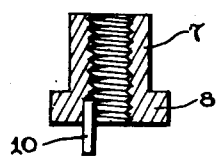
Fig. 12 is a detail sectional view of a separate ferrule and stop pin.
Figure 13:
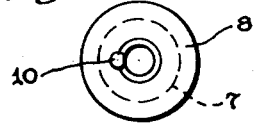
Fig. 13 is a bottom view of the ferrule and stop pin.

In the form of my invention shown in Figs. 1, 3 and 11 of the drawings, I provide a stop pin 10 which is rigidly mounted in the upper valve disc 2 within the recess 4, the upper end of said pin projecting upwardly into a suitable recess or slot 11 in the flange 8 of the ferrule. As shown in Fig. 6, this recess or slot is substantially rectangular in shape and sufficiently longer than the thickness of the pin 10 to permit a slight relative rotational movement between the disc 2 and the stem 6.

Figure 7:
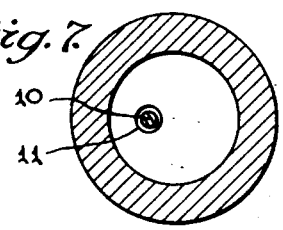
Fig. 7 is a sectional view taken on line 7—7 of Fig. 2.

In the form of my invention shown in Figs. 2, 4, 12 and 13, the pin 10 is rigidly mounted in the lower portion of the ferrule 7 between the threads on the valve stem and ferrule, and projects downwardly into a suitable recess 11 located in the bottom of the recess 4 in the upper valve disc 2. In Fig. 7, this recess 11 is shown as cylindrical, but it is obvious that it may be rectangular, arc-shaped or of any other suitable form, its purpose being to permit a slight relative rotational movement between the valve disc and ferrule, as hereinbefore stated.

It will be noted that with the stop pin 10 located intermediate the complementary threads of the valve stem and ferrule, this threaded joint is locked so that said valve stem and ferrule are prevented from becoming loose or disengaged.

Figure 4:
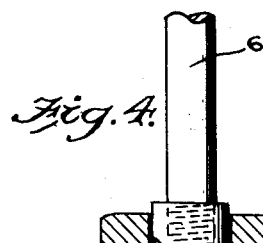
Fig. 4 is a view similar to Fig. 2 but showing concavo-convex surfaces at adjacent points on the ferrule and valve disc.

Figs. 3 and 4 show a form of universal joint wherein the lower face 12 of the flange 8 is convex and the complementary face 13 of the recess 4 is concave to permit a rocking action between the valve disc and ferrule whereby it is possible for the stem to assume a slight angular position with respect to the center line of the valve disc without preventing the valve disc from properly seating.

Figure 5:
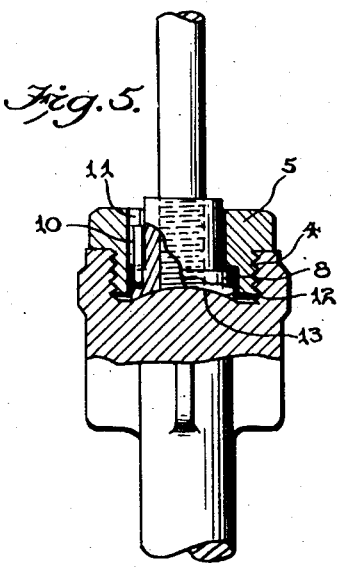
Fig. 5 is a view of a further modification, wherein the stop pin projects upwardly from the flange of the ferrule and is adapted to engage a recess or slot in the adjacent face of the valve disc bushing. This figure also shows concave-convex surfaces on the adjacent faces of the ferrule and valve disc but arranged oppositely to those shown in Figs. 3 and 4.

Fig. 5 shows a still further modification of both stop in and universal joint. In this form of the invention the stop pin 10 is rigidly mounted in the flange 8 and projects upwardly therefrom into a suitable slot or recess 11 in the adjacent inner face of the bushing 5. The lower face 12 of the flange 8 is concave, and the bottom 13 of the recess 4 is convex.

Figure 8:
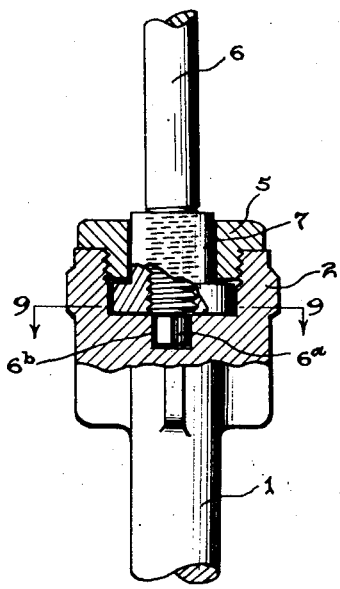
Fig. 8 shows a still further modification wherein the valve stem extends entirely through the ferrule with its lower end squared to engage a squared recess in the valve disc, the latter being of slightly larger dimensions than the former to allow a predetermined relative movement.
Figure 10:
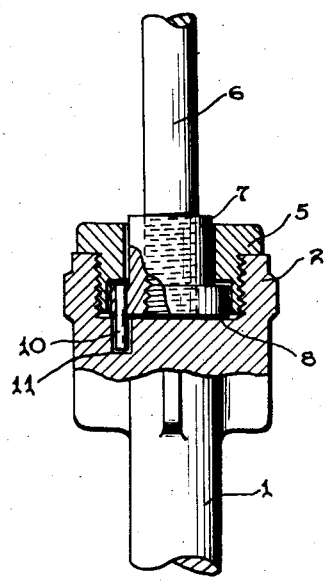
Fig. 10 is a view similar to Fig. 1 but with the stop pin oppositely arranged.
Figure 9:
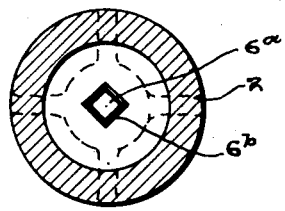
Fig. 9 is a sectional view taken on line 9—9 of Fig. 8.

Referring to Fig. 8 it will be noted that the lower end of the valve stem 6 projects through the ferrule 7 with its lower end squared or otherwise suitably shaped as at 6a to engage a complementary recess 6b in the adjacent surface of the valve disc 2, said recess 6b being sufficiently larger in dimensions to permit a slight relative movement between the valve stem and the valve disc. With this structure the stop pin 10 is eliminated as the squared end 6a of the valve stem, cooperating with the complementary recess 6b in the valve disc, performs the same function.

In Fig. 11 I have shown the ferrule 7 and flange 8 integral with the valve stem 6, thus forming an enlarged portion thereon, the stop pin 10 being located in the valve disc and projecting upwardly into a suitable recess 11 in the flange 8 of the enlarged portion. It will be understood that the structures shown in Figs. 8 and 11 may be combined if desired, to eliminate the use of the stop pin 10. In other words by constructing the valve stem and ferrule in one piece, with a projecting lug, squared or otherwise suitably shaped such as at 6a in Fig. 8, and recessing the valve disc adjacent said lug, I can provide a practical and simple embodiment of my invention.

It will thus be seen that with any of the foregoing arrangements installed in a valve body, with the valve stem 6 extending through a stuffing box or the like, even though the stuffing box may not be in exact alignment with the valve seat or port, the valve disc is permitted to adjust itself either radially, angularly or laterally until its proper position is obtained. Furthermore, the spinning of the valve on the stem, which might otherwise occur with a valve of the type provided with valve guide wings as shown in the drawings, is prevented by the stop pins 10 or the squared end 6a, which are so arranged as to allow sufficient relative movement of the parts to permit the self-adjustment and seating of the valve disc or discs.

While I have shown and described a number of modifications of my invention, it is to be understood that I in no way intend to limit myself to these particular adaptations, as I can conceive various other modifications of the same principle which might operate with equal effect. Furthermore, while I have shown in the drawings a valve of the double seated type, my invention may be employed in connection with either single or double seated valves, having beveled seats, piston type seats, V-notched construction, cone shapes and various other forms.

From the foregoing it is believed that the construction and advantages of my invention may be readily understood by those skilled in the art without further description, it being borne in mind that numerous changes may be made in the details of construction without departing from the spirit of the invention as set forth in the following claims.

What I claim and desire to secure by Letters Patent is:—

1. In a valve including a valve disc and valve stem, a flexible joint between said disc and stem comprising a ferrule carried by said stem and adapted to fit into a suitable recess in the valve disc, means for securing said ferrule in place in said recess, a stop pin mounted in one of said members and adapted to project into a suitable recess in at least one other of said members, whereby a predetermined relative movement is permitted between the valve disc and stem.

2. A device as claimed in claim 1 wherein the engaging faces of said ferrule and valve body are shaped so that one is concave and the other is convex to permit a relative rocking movement in any direction.

3. A device as claimed in claim 1 wherein said stop pin is carried by said ferrule and is adapted to engage a complementary recess in said valve disc.

4. A device as claimed in claim 1 wherein said stop pin is carried by said valve disc and is adapted to engage a suitable recess in said ferrule.

5. A device as claimed in claim 1 wherein said ferrule is provided with a radial flange at its lower extremity, and wherein the means for securing the ferrule in place in the recess comprises a bushing adapted to be secured to said valve disc and recessed to provide a shoulder for engaging the flange on the said ferrule.

6. In a valve including a valve disc and valve stem, a flexible joint between said disc and stem comprising an enlarged element carried by said stem and adapted to loosely but operatively engage the valve disc, and a rigid projection carried by one of said members and adapted to engage a complementary recess in the adjacent member, said recess being sufficiently larger than said projection to permit a limited relative movement of said members.

7. In a valve including a valve disc and valve stem, a flexible joint between said disc and stem comprising a ferrule carried by said stem and adapted to fit into a suitable recess in the valve disc, means for securing said ferrule in place in said recess, longitudinal and transverse clearances between said ferrule and the securing means to permit a relative universal movement of said disc on said stem and a rigid projection carried by said stem and extending into said valve disc for engagement with a complementary recess in said disc, said recess being sufficiently larger than said projection in transverse dimension to permit a limited relative rotary movement of said stem and disc.

8. A device as claimed in claim 6 wherein said rigid projection is provided with at least one flat side, and said complementary recess is correspondingly shaped so as to limit the relative movement of said disc and stem.

9. A device as claimed in claim 6 wherein said projection is substantially rectangular in cross section, and said complementary recess is correspondingly shaped.

10. In a valve, a valve disc, a valve stem, a ferrule carried at the lower end of said valve stem, said ferrule being provided with a radial flange at its lower extremity, means for securing said ferrule to said valve disc, comprising a bushing adapted to engage said valve disc, whereby said valve disc and ferrule are capable of relative movement with respect to one another, and a projection carried by one of said last named elements and adapted to engage a complementary recess in the adjacent element for limiting said movement.

11. In a valve, a valve disc, a valve stem, a member carried at the lower end of said valve stem, means for securing said member to said valve disc, whereby said member and valve disc are capable of relative movement with respect to one another, the adjacent engaging faces of said member and valve disc being concavo-convex in shape to permit a relative rocking movement in any direction, and a projection carried by one of said members and adapted to engage a complementary recess in the other member for limiting said relative movement.

12. A flexible joint for use between a valve and valve stem comprising a valve disc, a valve stem, a member carried at the lower end of said valve stem, said member being secured to said valve disc by a connecting means having longitudinal and transverse clearances with respect to said member, whereby said member and valve disc are capable of relative universal movement with respect to one another, and means to prevent the spinning of said disc on said member and stem.

13. In a valve, a valve disc, a valve stem, a member carried at the lower end of said valve stem, said member being secured to said valve disc by a connecting means having longitudinal and transverse clearances with respect to said member, whereby said member and valve disc are capable of relative universal movement with respect to one another, and a projection carried by one of said members and adapted to engage a complementary recess in the other member to prevent the spinning of said disc on said member and stem.

14. In a valve, a valve disc, a valve stem, a member carried at the lower end of said valve stem, said member being secured to said valve disc by a connecting means having longitudinal and transverse clearances with respect to said member, whereby said member and valve disc are capable of relative universal movement with respect to one another, and a stop pin carried by one of said members and adapted to engage a complementary recess in the other member to prevent the spinning of said disc on said member and stem.

In testimony whereof I affix my signature.

LYLE W. BROWNE.